Figure 1:
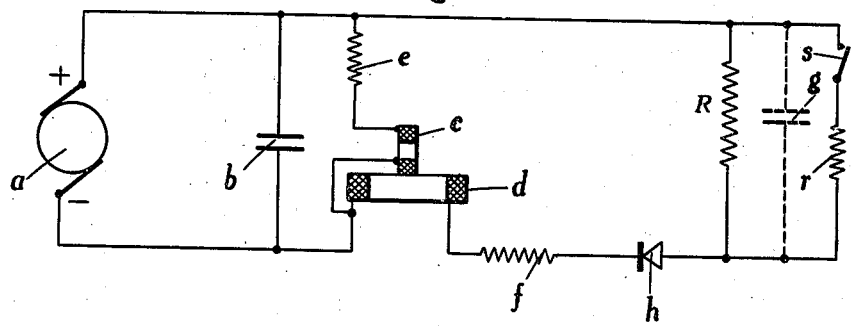

April 28, 1942.  R. T. WRIGHT  2,281,470
ELECTRICAL MEASURING INSTRUMENT
Filed Aug. 7, 1939  2 Sheets-Sheet 1

Inventor
Ralph Tyrrell Wright
by
Ralph B. Stewart
Attorney

April 28, 1942.  R. T. WRIGHT  2,281,470
ELECTRICAL MEASURING INSTRUMENT
Filed Aug. 7, 1939  2 Sheets—Sheet 2

Inventor
Ralph Tyrrell Wright
by Ralph B. Stewart
Attorney

Patented Apr. 28, 1942

2,281,470

UNITED STATES PATENT OFFICE 2,281,470

ELECTRICAL MEASURING INSTRUMENT

Ralph Tyrrell Wright, Chiswick, London, England, assignor to Evershed & Vignoles Limited, Chiswick, London, England, a British company Application August 7, 1939, Serial No. 288,903
In Great Britain September 24, 1938

4 Claims. (Cl. 171—95)

This invention relates to the measurement of high electrical resistances such as are encountered in insulation resistance measurements. When such resistance is associated with considerable electrostatic capacity, as occurs, for example, when testing long lengths of lead-covered telephone cable, a steady direct testing voltage is essential since fluctuations in voltage cause charging and discharging currents to flow into and out of the capacity, thus causing wandering of the pointer of the measuring instrument.

A battery, of course, provides a steady source of testing potential but a very bulky battery would be needed to supply the voltage required for insulation testing. For this reason, a generator driven through a constant speed clutch is generally used as the source of supply.

If a supply of alternating current from the mains is available, a small generator driven by a motor, preferably a synchronous motor, may be employed as the source, for the variations in the mains frequency are usually not as great or as rapid as the variations in the mains voltage and hence a steadier speed results if the motor is of the synchronous type. A barretter may be used in addition, or a voltage regulator of the electronic or gaseous discharge type may be used, or the generator may be furnished with a smoothing filter consisting, for example, of series inductance and shunt capacity. However, it is found that precautions of these kinds are not sufficient to give steady readings when measuring very high insulation resistances. In this connection, it should be remembered that readings of insulation resistance of the order of 1,000 megohms have to be made with a testing voltage of 500 volts when the current is of the order of 0.5 microampere. A very small fluctuation in the testing voltage will cause a current much in excess of this to flow into or out of the capacity, which may amount to 20 microfarads for example, which is a value which may well be met when testing a length of telephone cable as mentioned above.

The present invention aims at providing a simple means for reducing the unsteadiness in readings which may arise from the above cases.

The charging and discharging currents, which give rise to wandering or fluctuations of the pointer of the measuring instrument, can be reduced by inserting a device, such as a resistance much higher than the series resistance usually provided, in the measuring circuit. However, the use of such a high resistance has two disadvantages. First, the time required to charge the capacity in the circuit becomes very lengthy. Thus, if a series resistance of about 35 megohms is provided, the time amounts to as much as 30 minutes, if there is a capacity of about 20 microfarads associated with the resistance to be measured, and during this time the instrument gives erroneous readings of the resistance under measurement. Secondly, the use of such a high resistance shortens the scale of the measuring instrument which, therefore, becomes less sensitive in the region of a resistance equal to or lower than that of the high resistance inserted.

According to the present invention, a unidirectional device, which has a much higher resistance in one direction than the other, is inserted in the measuring instrument; fluctuation of the needle of the instrument is reduced or avoided by the fact that a relatively high resistance opposes the discharge of the capacity in circuit, while the time required to charge that capacity is kept short owing to the fact that the device only exerts a relatively small resistance to the charging current. Such a device allows the charging current to pass freely, does not interfere with the sensitivity of the measuring instrument at the lower end of the scale, and results in fluctuations of the pointer being almost entirely obliterated. A half-wave rectifier of the oxide film type serves the purpose satisfactorily, but the invention is not limited to the use of this particular type of non-return device.

In order that the invention may be more fully explained, one example in accordance therewith will now be described with reference to the accompanying drawings, wherein Figure 1 is a diagram of the circuit employed in that example, and Figures 2 to 5 are graphical explanatory diagrams.

In Figure 1 a circuit of the general kind used in insulation resistance measurement is illustrated, in which $a$ is the direct current generator driven, for example, by hand or by a synchronous motor, $b$ is a condenser connected across its terminals to smooth the ripples in the output from the generator, $c$ is the control coil and $d$ the deflection coil of the crossed-coil instrument of the ratio-meter type. The coil $c$ is connected across the potential of the generator $a$ in series with a swamping resistance $e$, and the coil $d$ is connected in the circuit to receive the current passing to the test resistance R and has in series with it a swamping resistance $f$, which however is of the order of 0.3 megohm and therefore small relatively to the insulation resistance R to be measured. In the usual way the deflection of the instrument c, d is an indication of the ratio between the currents flowing in the coils, that is to say of the ratio between the potential applied to the test resistance and the current flowing to it, so that the instrument measures the insulation resistance direct. The condenser g, shown in dotted lines, indicates the capacity associated with the test resistance R.

According to the invention, in this example a half-wave rectifier of the oxide film type is inserted in series with the circuit at h and, as indicated, it is so directed that the charging current flowing from the positive terminal of the generator a experiences only small resistance in the rectifier h, whereas the resistance to the opposing discharge current is relatively very high.

Figure 2:
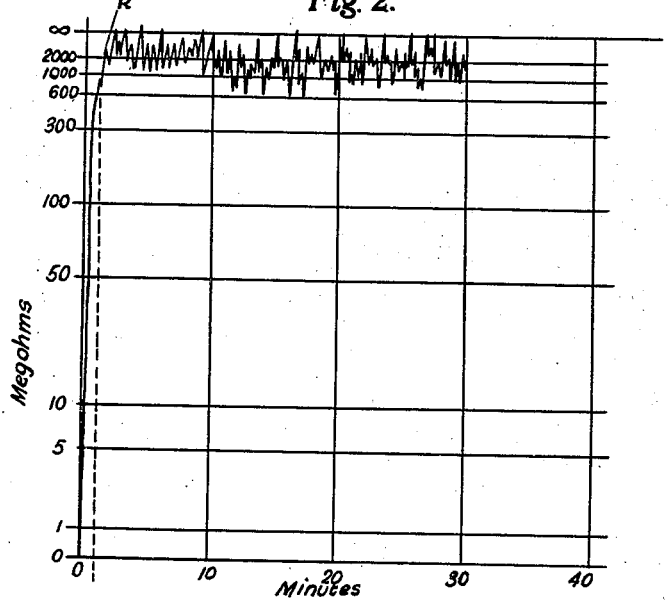
Figure 3:
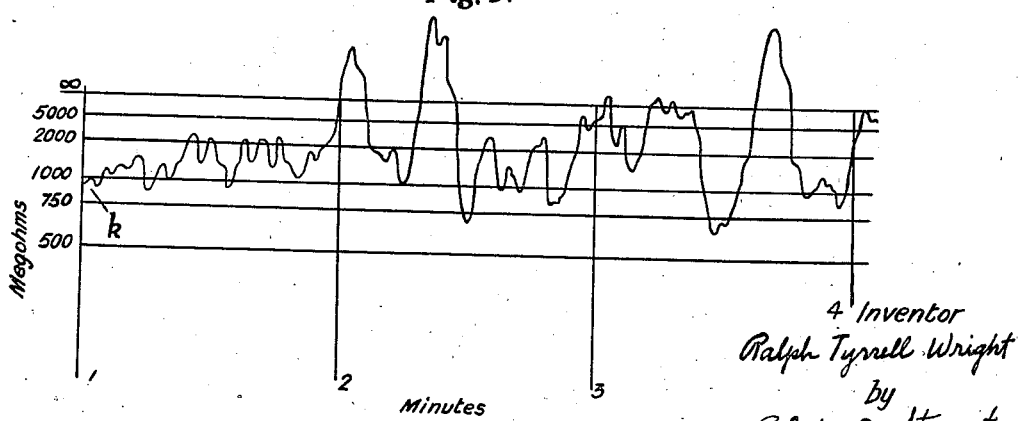

Figure 2 is a curve in which the ordinates represent the scale reading of the pointer of the instrument c, d, while plotted horizontally is the time in minutes commencing at the switching-on of the resistance R. In the usual case with the circuit shown in Figure 1, except that the rectifier h is omitted, the resistance to be measured is about 3,000 megohms, the capacity associated with the resistance approximately 20 microfarads, and the voltage provided by the generator a 1,000 volts subject to slight unavoidable fluctuations. At the point k the capacity has become substantially charged to the generator potential in approximately one minute, but it is seen that after the point k has been reached the pointer fluctuates, even at some points exceeding the infinity mark on the scale. To illustrate this more clearly, the part of the curve extending from the point k and going on for the next three minutes is illustrated on an enlarged scale in Figure 3.

Figure 4:
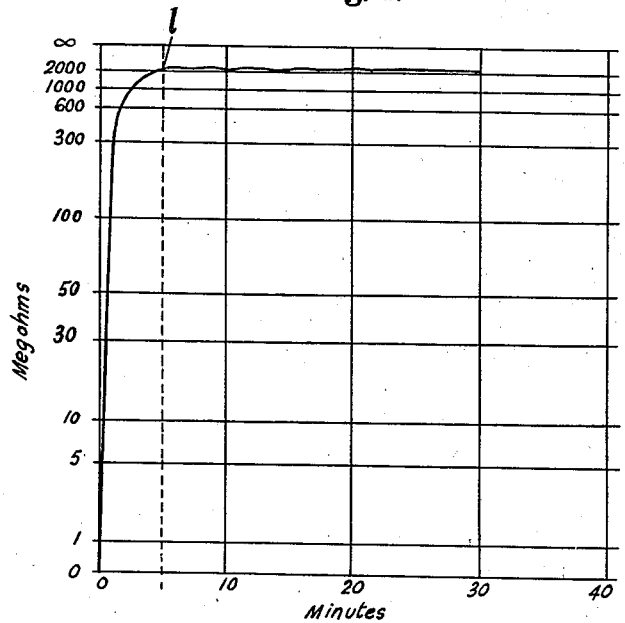
Figure 5:
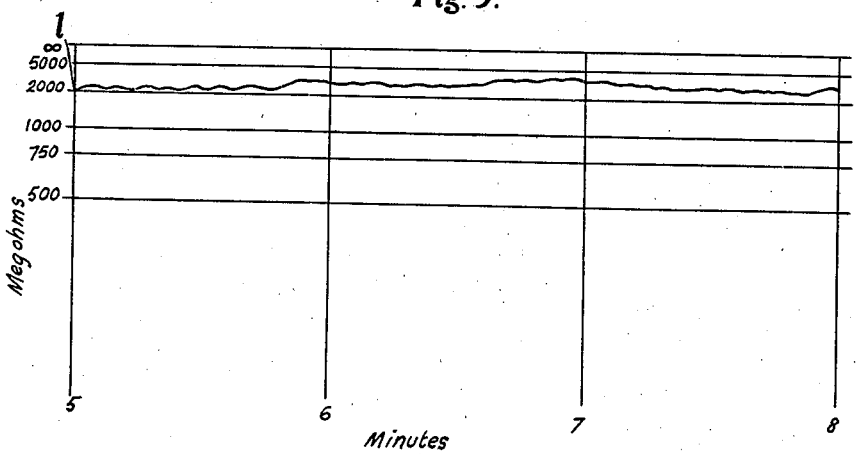

In comparison with Figures 2 and 3, Figures 4 and 5 represent similar conditions with, however, the rectifier h in circuit. Figure 4 shows that the point l, at which the capacity associated with the resistance R is fully charged, occurs about five minutes after switching-on, which of course is a reasonably short time in practical testing, and after this point the curve is fairly flat and free from fluctuations. The part of the curve extending from the point l for the ensuing three minutes is shown on an enlarged scale in Figure 5, and this clearly shows how the rectifier h has smoothed out the fluctuations.

It should be mentioned that a comparable amount of smoothing can be obtained if, instead of the rectifier h a high resistance, for example, of 34.3 megohms is inserted in the circuit, but then the two disadvantages already mentioned arise. First of all, it takes about 35 minutes to charge up the capacity which renders testing in that way impracticable and, in addition, the scale is shortened since the zero mark on the scale, owing to the presence of the high series resistance, occurs at the point corresponding to 34 megohms on the scale according to Figures 2 or 4.

When the rectifier h is connected as shown in Figure 1 it prevents discharge of the capacity g after the test, but that drawback can easily be overcome by providing a discharging switch, indicated at s, for connecting a resistance r of appropriate value across the capacity g so that the latter can discharge through the resistance r.

I claim:

1. An apparatus for the measurement of high electrical resistance, comprising a source of unidirectional electric current, a rectifier connected to pass current flowing from said source through the resistance to be measured, and an electrical instrument for measuring the current flowing from said source to the resistance through said rectifier.

2. An apparatus for the measurement of high electrical resistance, comprising a generator of unidirectional electric current, a rectifier of the dry-contact type connected to pass current flowing from said generator through the resistance to be measured, and an electrical measuring instrument having crossed control and deflection coils connected respectively across the terminals of said generator and in series with said generator and said rectifier.

3. Apparatus for measuring the resistance of a device or element having high electric resistance associated with appreciable electrostatic capacity, comprising a source of unidirectional voltage having connections for supplying current to said device, a measuring instrument included in said connections for measuring said current, and a rectifier element included in the current connection between said source and said device and arranged to offer low resistance to the flow of said current and to present relatively high resistance to current flow caused by the discharge of the electrostatic capacity of said device through said instrument.

4. In a system for measuring high electrical resistance, the combination of a device to be measured having high resistance and high electrostatic capacity, a source of unidirectional voltage subject to small variations in value, a circuit for supplying unidirectional current from said source to said device, a measuring instrument included in said circuit to measure the value of said current, and a rectifier element inserted in said circuit and arranged to present low resistance to the flow of current from said source to said device and to present relatively high resistance to the flow of current resulting from the discharge of the electrostatic capacity of said device through said instrument.

RALPH TYRRELL WRIGHT.